United States Patent [19]

Lewis

[11] 4,097,846
[45] Jun. 27, 1978

[54] DATA STORAGE AND RETRIEVAL SYSTEM

[75] Inventor: Gary Lewis, St. Clair Shores, Mich.

[73] Assignee: Energy Conversion Devices, Inc., Troy, Mich.

[21] Appl. No.: 786,117

[22] Filed: Apr. 8, 1977

[51] Int. Cl.$^2$ .............................................. G06K 9/12
[52] U.S. Cl. .................. 340/146.3 H; 340/146.3 MA
[58] Field of Search ................ 340/146.3 H, 146.3 Z, 340/146.3 MA, 146.3 F, 146.3 AC

[56] References Cited

U.S. PATENT DOCUMENTS

| | | | |
|---|---|---|---|
| 3,140,466 | 7/1964 | Greanias et al. ............ | 340/146.3 AC |
| 3,289,164 | 11/1966 | Rabinow ....................... | 340/146.3 H |
| 3,351,906 | 11/1967 | Van Duuren ................. | 340/146.3 Z |

*Primary Examiner*—Leo H. Boudreau
*Attorney, Agent, or Firm*—Wallenstein, Spangenberg, Hattis & Strampel

[57] ABSTRACT

Preferably, a linear array of light sensing elements is positioned opposite light projected images of alphanumeric or pictorial data recorded on the frame of a microfiche card or the like. Each alpha-numeric character or pictorial pattern segment is dividable into individual rows and columns of image-forming spots which together form a particular alphabet or numeral character or pictorial pattern segment. The sensing elements and the image spots projected thereon are related in size such that an integral number of light sensing elements are required in both X and Y axis directions to intercept a single image spot. One of the microfiche card or light sensing elements are movable relative to the other so that the various image spots projected therefrom are scanned during a given scanning cycle. The outputs of the sensing elements are sampled at a frequency such that the sampled light sensing element outputs over a given scanning cycle represents the outputs of a hypothetical multiplicity of groups of light sensing elements of said size, together encompassing the entire image field involved, with each group intercepting one image spot. The sampled outputs of the light sensing elements are fed to threshold detector means, which detect only signals representing signals above or below a given threshold level. The threshold detected signals are initially stored as markers in a storage unit having respective groups of storage points respectively corresponding in number and position to the various groups of light sensing elements for said hypothetical multiplicity of groups of sensing elements. The markers in said groups of storage points are respectively "OR" gated, and the gated signals are stored as markers in corresponding storage points in a second storage unit.

37 Claims, 26 Drawing Figures

RELATIVE POSITIONS OF CHAR. IMAGE SPOTS & SENSING ELEM.

X AXIS MIS-ALIGNMENT

SHIFT REGISTER MARKER PATTERN

RELATIVE POSITIONS OF CHAR. IMAGE SPOTS & SENSING ELEM.

X & Y AXIS MIS-ALIGNMENT

RELATIVE POSITIONS OF CHAR. IMAGE SPOTS & SENSING ELEM.

X & Y AXIS MIS-ALIGNMENT

SHIFT REGISTER MARKER PATTERN

RECONST. MARKER PATTERN

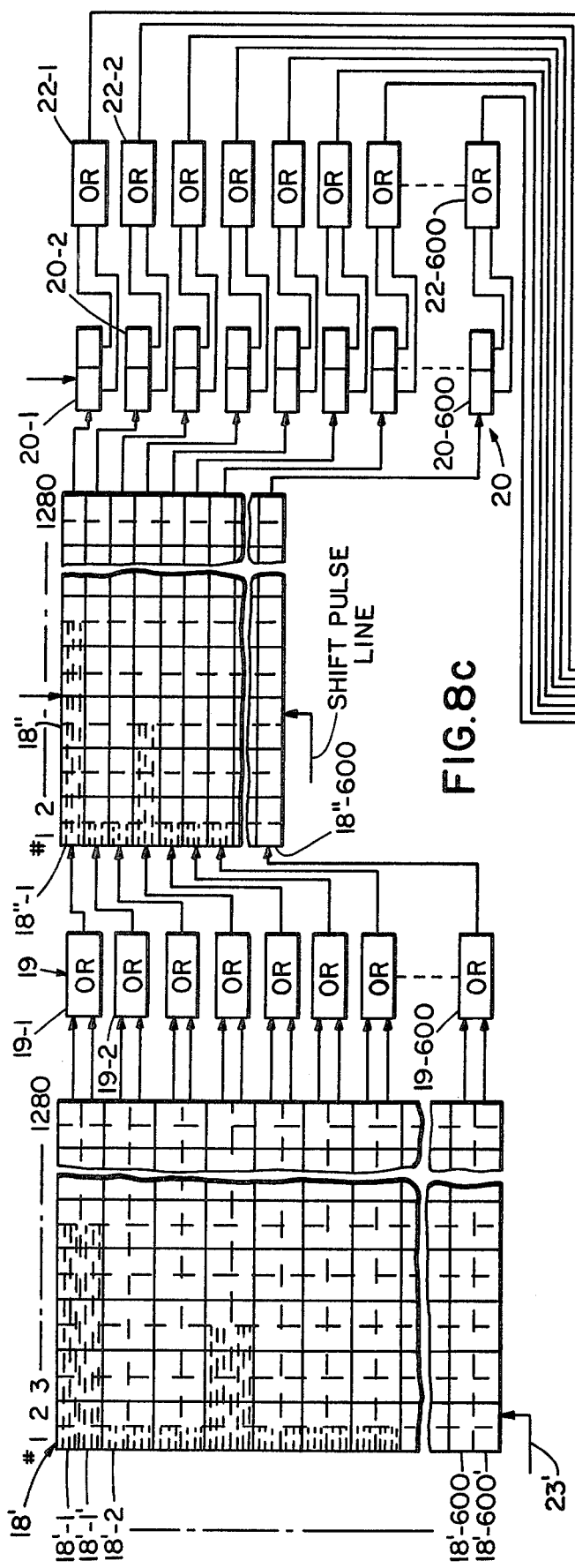
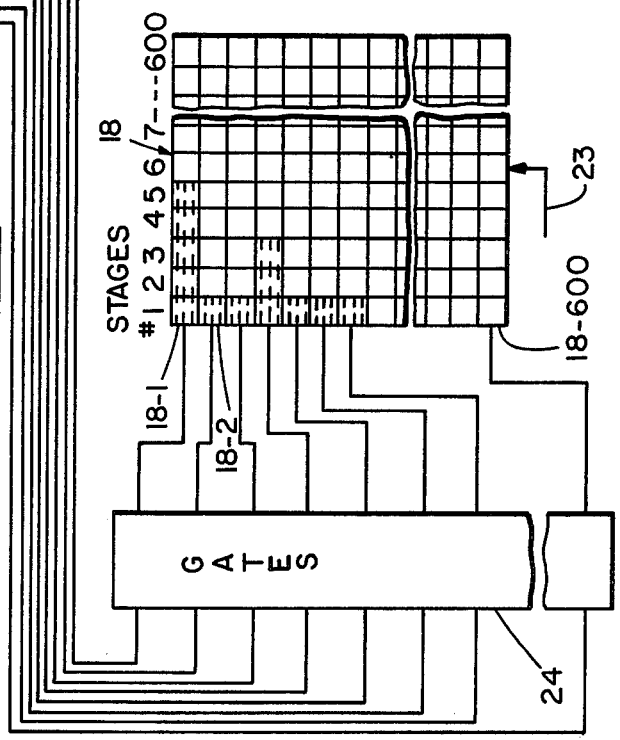
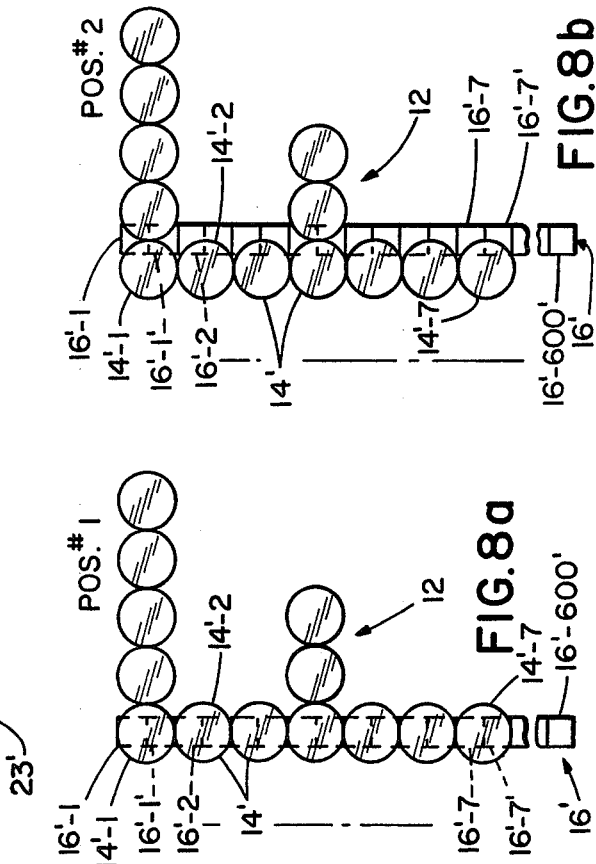
FIG.8c
FIG.8b
FIG.8a

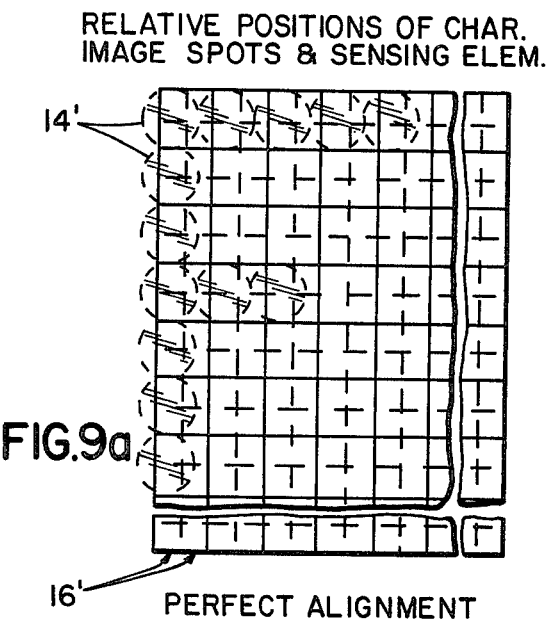
FIG.9a — RELATIVE POSITIONS OF CHAR. IMAGE SPOTS & SENSING ELEM. — PERFECT ALIGNMENT
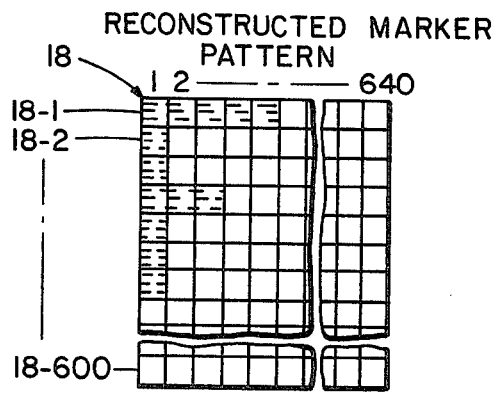
FIG.9c — RECONSTRUCTED MARKER PATTERN
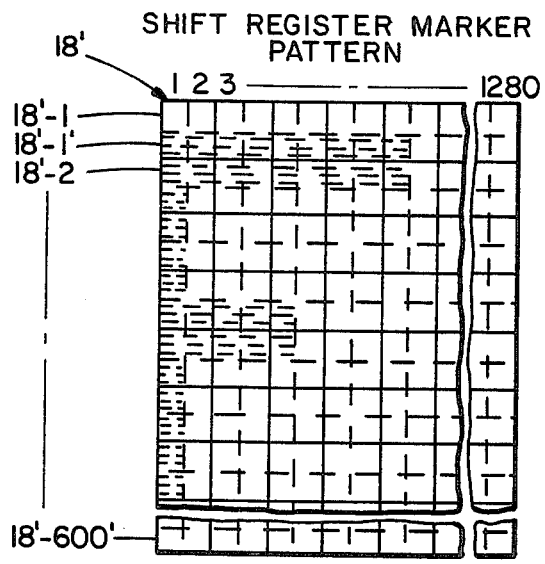
FIG.9b — SHIFT REGISTER MARKER PATTERN
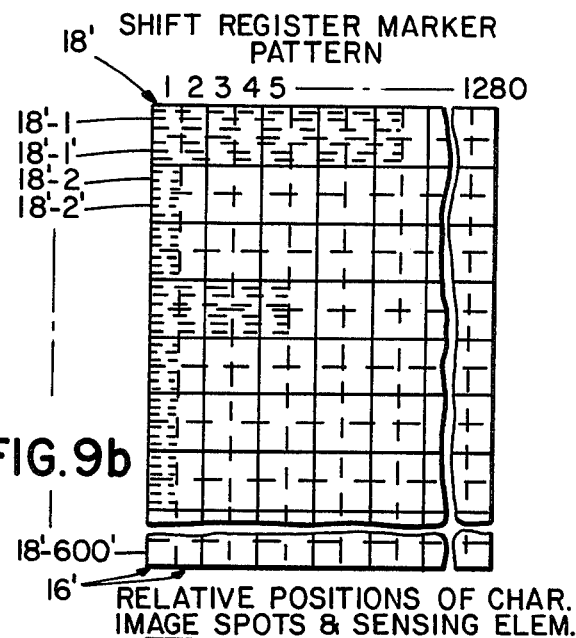
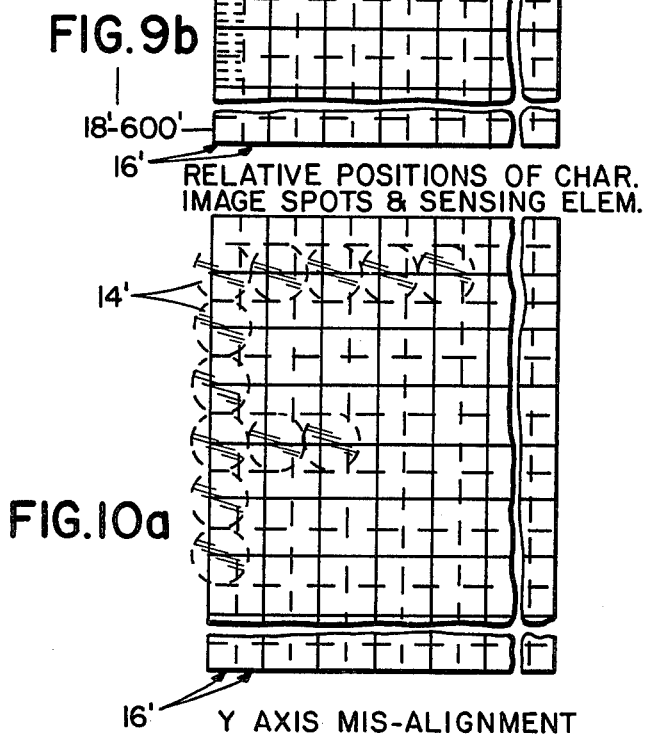
FIG.10a — RELATIVE POSITIONS OF CHAR. IMAGE SPOTS & SENSING ELEM. — Y AXIS MIS-ALIGNMENT
FIG.10b — SHIFT REGISTER MARKER PATTERN
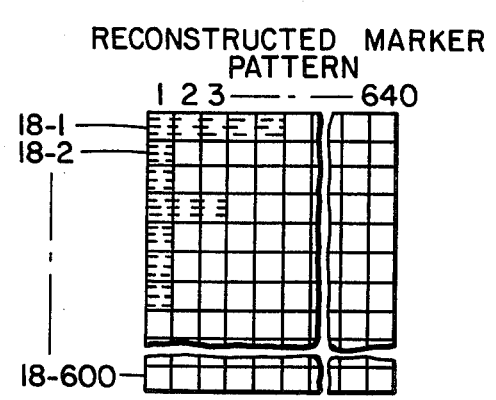
FIG.10c — RECONSTRUCTED MARKER PATTERN

RELATIVE POSITIONS OF CHAR. IMAGE SPOTS & SEN. ELEMENTS

X AXIS MIS-ALIGNMENT

SHIFT REGISTER MARKER PATTERN

DATA STORAGE AND RETRIEVAL SYSTEM

BACKGROUND OF THE INVENTION

This invention deals with the retrieving of information on a recording medium where such information is preferably recorded in alpha-numeric and/or pictorial form, although many aspects of the invention are useful where the information is recorded in binary coded form thereon. Also, the main commercial application of the invention is in retrieving information from microfiche cards or the like, where the data is in the form of patterns of light-transparent or opaque areas or spots forming minute, not directly visibly discernible characters or pictorial patterns which can be visibly read by placing the same in a conventional microfiche card reader or the like.

The recording of office and other business records on microfilm to replace voluminous paper records is obviously highly desirable. However, the recording of records on microfilm has not found more extensive use in business and commercial establishments because of the often poor quality of microfilm records, the expense and inconvenience in making the same, and the limited life of such records which require periodic updating thereof. However, recent important innovations disclosed in copending application Ser. No. 724,084, filed Sept. 16, 1976, and in U.S. Pat. No. 3,966,317, granted June 29, 1976, have made possible, at reasonable cost, the formation of high resolution, archival, microfilm records directly from soft copy or operation of a typewriter. When equipment including these innovations become commercially available, the making of microfilm records to replace paper records should become commonplace.

While the retrieval of information from such microfilm records will continue to be through the use of microfilm readers, it would be extremely desirable to be able automatically to retrieve directly the data recorded on the microfilm record in electrical binary coded form so that it can be used directly by a computer or facsimile transmission system. At present, reasonably priced equipment for automatically retrieving information from microfilm records in electrical binary coded form is not available. To produce data on microfilm in binary coded form it is generally necessary for the alpha-numeric or pictorial data (like curves and the like) recorded on microfilm records be manually converted into binary form by an operator who uses a keyboard operated tape-punching device to form a punched tape record of the data. This tape is then fed through a punch tape reader to produce the binary coded signals fed to a computer or the like.

Equipment heretofore developed for automatically retrieving data from microfilm records in electrical binary coded form typically costs as much as $50,000–100,000 or more. Some of these systems utilized laser scanning of data which is undesirable not only from the standpoint of its expense, but also because laser equipment is not permitted in ordinary business and commercial establishments because of the potential health hazard. The present invention makes possible the rapid scanning and retrieval of data in binary coded form from data recorded in binary or alpha-numeric or pictorial form without the use of laser energy, and at a very modest cost in comparison to this prior art equipment.

It would seem that alpha-numeric or pictorial images recorded on microfilm or the like can be converted to electrical signals and then converted to proper binary coded signals for transmission to computer or facsimile equipment by supporting the microfilm in the form of a microfiche card or the like on a suitable carrier, projecting light through a selected frame of the microfiche card, and then moving the card past a line scanning camera as, for example, the line scanning camera manufactured by Fairchild Camera and Instrument Corporation sold under the model designation CCD 1300. Such equipment has a sensing unit with spaced light sensing elements upon which the projected light images can be projected. Each light sensing element develops a signal of a value proportional to the amount of light energy striking the same. Because of the small size of the sensing elements, this equipment can scan micro-sized or magnified images of the data stored on the microfiche frame involved. However, initial efforts to satisfactorily achieve this result failed because the binary coded signals produced did not represent or accurately reproduce the original alpha-numeric or pictorial data. An investigation into the reasons for the failure of this equipment to operate in its intended manner was that satisfactory results required consistent relatively precise positioning and spacing of the characters on the microfiche frames and precise consistent alignment of the light sensing elements of the camera with the image elements being scanned, which conditions are not readily or practically obtainable at a reasonable cost with technology available before the present invention.

The problem involved can best be understood if the arrangement of the image-forming elements on a microfilm record is examined. Thus, the image field on a microfiche card frame can be divided into successive horizontal lines of potential image element (or spot) locations spaced apart a fixed given distance. The various alpha-numeric character or pictorial images recorded thereon can be divided into individual rows and columns of imageforming spots which together form a particular alphabet or numeral character or pictorial pattern segment. Ideally, these imageforming spots are precisely centered within the various potential image spot locations in the image field. In such case, the data can be accurately retrieved by a linear array of light sensing elements precisely related to the image spots projected thereon on a one-to-one basis, that is, so that each image spot during the sampling of the outputs of the sensing elements is intercepted by a different single light sensing element. In such case, the sampled outputs of the light sensing elements can be stored as markers in shift registers in a pattern exactly duplicating the pattern of the image spots scanned. The information stored as markers in the shift registers can then be accurately converted to binary signals by comparing the signal patterns fed from the shift registers with signal patterns stored in a code register from which corresponding binary signals are fed to computer, facsimile recorders or other readout devices.

However, the image-forming spots making up alpha-numeric characters or pictorial images are rarely consistently precisely centered within the aforementioned image spot locations of the image field and/or the light sensing elements or outputs are rarely precisely positioned or sampled so that only one light sensing element intercepts each image spot involved. The pattern of markers then stored in the pattern shift register may not accurately duplicate the image spots scanned and the binary signals developed therefrom do not accurately represent the original stored data. One approach to solving the misalignment problems is to produce at the time the data is recorded on the microfiche card a reference marker opposite each vertical segment of the character involved where alpha-numeric data is recorded, such reference mark being used for both timing the sampling of data from the light sensing elements and properly positioning the light sensing elements relative to the microfiche card. Such an alignment system has the serious disadvantage that the data must be scanned one line of data at a time and has the further disadvantage that the reference markers interfere with the reading and appearance of a projected image of the recorded data.

Accordingly, an object of the invention is to provide a unique data retrieval system which accurately retrieves information from any recording medium, most preferably a microfiche card as described, without the necessity of reference positioning marks thereon, and preferably in a way not requiring a line-by-line scanning of the data, so that a frame of data can be scanned in a very short time, preferably in about a second or less.

SUMMARY OF INVENTION

In accordance with one of the features of the invention, it has been discovered that data can be accurately electrically retrieved in binary form from a recording medium with the heretofore undesired misalignment problems by adjusting the size of the sensing elements or the image-forming spots (as with the aid of a suitable lens) whereby each sensing element is of a much smaller size than either the X or Y axis dimension of each image spot projected thereon, so that, most advantageously, an integral number of light sensing elements greater than 1 (preferably 2) will substantially exactly scan the X and Y axis dimensions of each image spot. Each light sensing element produces a signal of a value proportional to the area thereof which intercepts a light image of a given intensity. While, theoretically, the sensing unit used in the invention could comprise a very large number of sensing elements encompassing the entire projected image field, so that no scanning operation whatsoever is required, to reduce the cost of the sensing unit, it is preferable that the sensing unit comprises a linear array of sensing elements aligned in a direction at right angles to the direction in which the image-forming spots in the image field of the recording are to be scanned. To reduce retrieval time, scanning of the image field can be reduced to X or Y axis scanning only by making the linear array of elements of a size to span the entire corresponding dimension of the image field, or at least a substantial portion thereof, and preferably no less than one half of such dimension. In the case of microfilm records having the conventional 24 to 1 image reduction, this can be achieved by an array of about 1200 sensing elements when two sensing elements span a projected image spot. Such an array of light sensing elements occupying only a length of approximately one inch is already available at a modest cost.

During the X or Y axis scanning of the image spots, the outputs of the sensing elements are sampled at a frequency such that the sampled sensing element outputs represents the outputs of a theoretical multiplicity of groups of said sensing elements, each such group being of a size to intercept a single image spot when centered with respect thereto and together encompassing the entire projected image field.

The outputs of said sensing elements, whether produced by said multiplicity of sensing elements covering the entire image field or by scanning of the image field, is fed through threshold detecting circuitry which detects signals which are of a value which is greater or less than a given reference level, depending upon whether said image-forming spots transmit or don't transmit light.

While the signals so developed, theoretically, could be handled in the manner described without storing them or other signals developed therefrom first in one or more storage registers, it is preferred that a first storage unit be provided for the detected signals having groups of storage points respectively corresponding in number and position to said various groups of sensing elements of the actual or theoretical multiplicity of groups of sensing elements which intercept an entire image field. Means responsive to the signals detected by the threshold detector means is provided for storing patterns of markers in the associated threshold detected signals so that the pattern of the markers duplicates or corresponds to the placement of the sensing elements in said actual or hypothetical multiplicity of groups of sensing elements having output signals of a value greater or less than said given reference level. A storage unit sometimes referred to as a reconstructed marker storage unit is also preferably provided with storage points corresponding in number and position to the image-forming spot locations of the image field involved. The markers in the respective groups of storage points in the first storage unit are in one or two steps "OR" gated and fed to the corresponding storage points in the reconstructed marker storage unit. By adjusting the reference level of the threshold detecting means, which is generally set to one half the maximum signal level, the markers in the reconstructed marker storage unit will accurately duplicate the image spot patterns in the image field, even though there are significant misalignments between the projected image spots, their intended image spot locations in the image field, and/or the sensing elements.

Other objects, features and advantages of the invention deal, among other things, with the specific preferred manner in which the signals from the sensing elements are handled and stored in various storage registers.

DESCRIPTION OF DRAWINGS

FIG. 4 shows partially in block diagram form various basic elements of a system for retrieving electrical signals from a microfiche card frame in accordance with the technology present prior to the present invention, and under circumstances where the outputs of the light sensing elements shown are sampled at instants of time where there is perfect alignment between the sampled light sensing elements and the projected spots forming the character F;

FIGS. 5a, 6a and 7a respectively show the different relative positions of the linear array of sensing elements shown in FIG. 4 with the projected image spots of the character F respectively for the positions where there is a one-half spot mis-alignment therebetween in the Y axis direction, X axis direction and in both the X and Y axis directions;

FIGS. 5b, 6b and 7b respectively show the distortion or absence of image spot indicating markers in the pattern shift register shown in FIG. 4, resulting from the aforesaid misalignment conditions shown respectively in 5a, 6a and 7a;

FIG. 8a illustrates a preferred form of the present invention wherein the size and position relationships between the sensing elements and a column of character-forming spots are modified in accordance with the present invention so that two sensing elements intercept each image spot, and shows the condition where each image-forming spot is centered with respect to the pair of sensing elements;

FIG. 8b illustrates the position relationship between the sensing elements shown in FIG. 8a and the character forming spots when the character has been moved one-half a spot relative to the sensing elements shown in FIG. 8a;

FIG. 8c illustrates the various pattern shift register storage units and connecting "OR" gates which effect the storing of markers derived from threshold detected signals of the light sensing elements shown in FIG. 8a and 8b sampled each time the character F has been shifted one-half a spot width, so that the entire character is scanned, to eliminate the mis-alignment errors illustrated in FIGS. 5b, 6b and 7b;

FIGS. 9a, 10a, 11a and 12a respectively illustrate different relative positions between the sensing elements and the character-forming spots for the character F for the conditions where (a) the image spots are centered with respect to the associated pair of sensing elements, (b) the image spots are mis-aligned with respect to the associated pair of sensing elements in a Y axis direction by an amount equal to the height of a sensing element, (c) each image spot is mis-aligned with respect to the associated pair of sensing elements in the X axis direction by an amount equal to the width of a sensing element, and (d) the image spots are mis-aligned in both X and Y axis directions by this amount;

FIGS. 9b, 10b and 11b respectively show the markers in the first storage unit comprising a series of pattern shift registers shown in FIG. 8c, for the various alignment and misalignment conditions shown in FIGS. 9a, 10a and 11a;

FIGS. 9c, 10c and 11c respectively show the markers in the third or reconstructed marker shift register storage unit shown in FIG. 8c for the alignment and mis-alignment conditions illustrated in FIGS. 9a, 10a and 11a;

FIG. 12b illustrates the pattern of markers in the reconstructed marker shift register storage unit 8c under the mis-alignment condition shown in FIG. 12a.

DESCRIPTION OF EXEMPLARY FORM OF THE INVENTION

Figure 1:
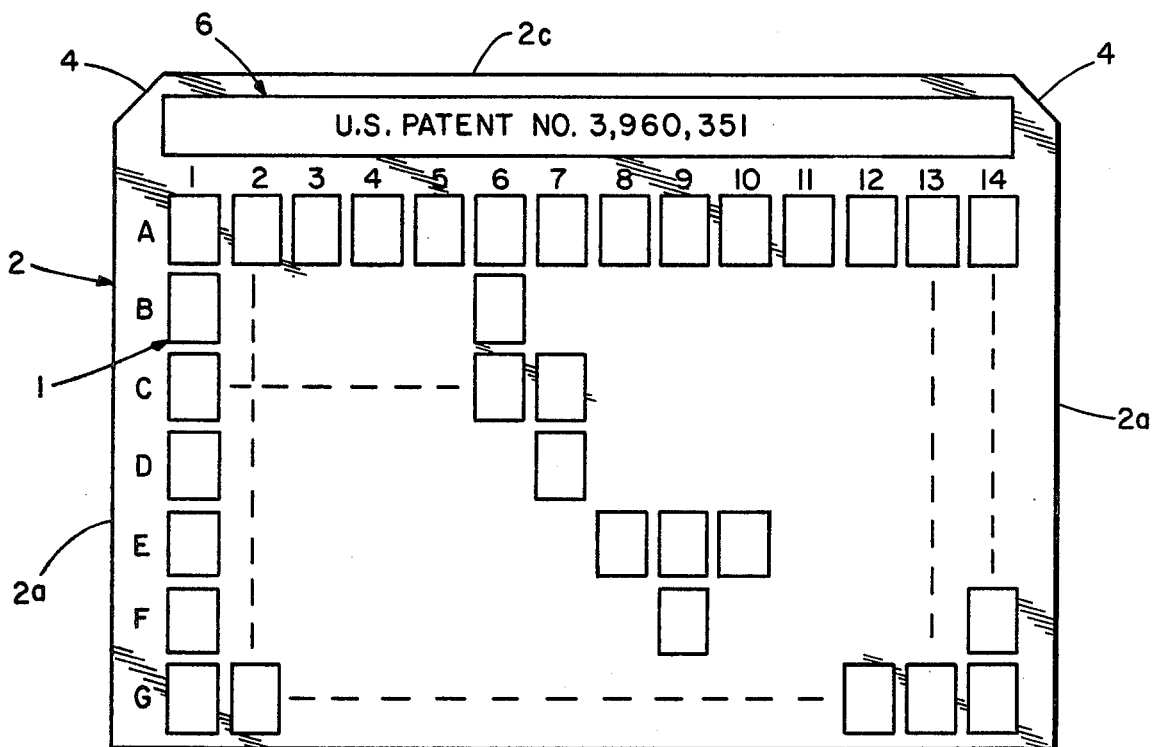
FIG. 1 is a plan view of a microfiche card from the selected frames of which data can be retrieved as electrical signals by the present invention.

As previously indicated, while the broad aspects of the invention envision the retrieving of data from recording media of a variety of forms, the most important commercial application of the invention is to retrieve data from microfilm, preferably in alpha-numeric or pictorial form, recorded thereon in patterns of light transparent and light opaque areas thereon. To this end, FIG. 1 illustrates a microfiche card 2 having individual frames of recorded alpha-numeric or pictorial data typically reduced 24 to 1 from normal size, so that it is not directly readable without image magnification. Thus, for example, each frame which may be a page of a magazine, book, etc., may occupy a space on the microfiche card of approximately 0.35 inch wide and 0.5 inch high. The various frames are arranged in rows with the corresponding frames in each row aligned vertically in columns, the rows of frames being identified in FIG. 1 by reference characters B through H and the individual frames in each row being identified by the reference numerals 1 through 14. Directly readable tilting information identifying the subject matter of the microfiche card is placed within an area 6 at the top of the card. The microfiche card shown is generally rectangular in shape and has parallel side edges 2a—2a, a bottom edge 2b extending between the side edges 2a—2a and a top edge 2c. The top edge 2c is joined to the side edges 2a—2a by inclined upper edges 4—4.

Figure 3:
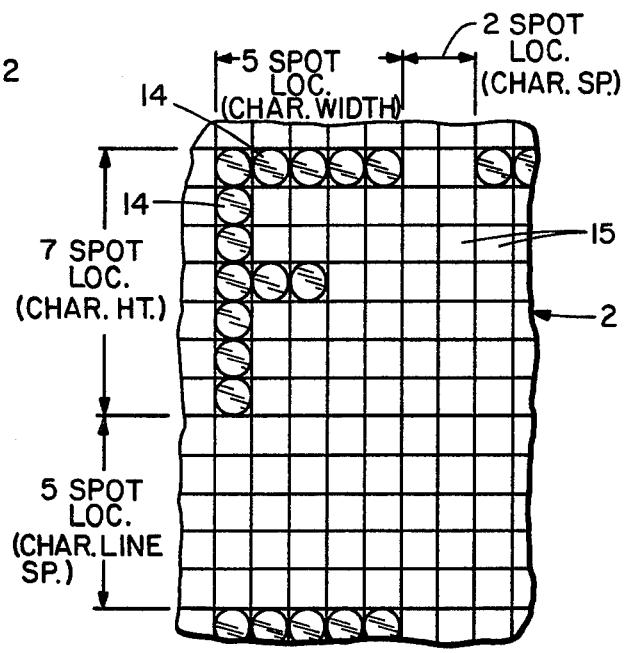
FIG. 3 shows an exemplary image spot format for the character F and various character and line spacing dimensions in terms of the number of image-forming locations encompassing the same.

The present invention retrieves the data in a selected frame in the form of electrical signals. To this end, light is projected through a selected frame to produce patterns of light and dark areas from the particular alpha-numeric, pictorial data or binary coded data recorded thereon. The light projected data can be broken down into patterns of rows and columns of square or circular light or dark image spots formed from corresponding image-forming spots 14 (FIG. 3) on the microfiche card. (While FIG. 3 shows the character formed from contiguous circular image-forming spots, this and other characters could be formed by line segments of equal thickness, which lines can be said to be made of contiguous square image-forming spots.) Light sensing elements to be described respond to the individual light or dark image spots. The ability of the light sensing elements, and associated circuits to be described, to produce signals which accurately depict the data involved in facilitated by the production of sharp images on the recording medium preferably formed by well defined image spots roughly located within potential image spotforming locations 15 regularly spaced apart one image spot width in aligned rows and columns as shown in FIG. 3.

Figure 2A:
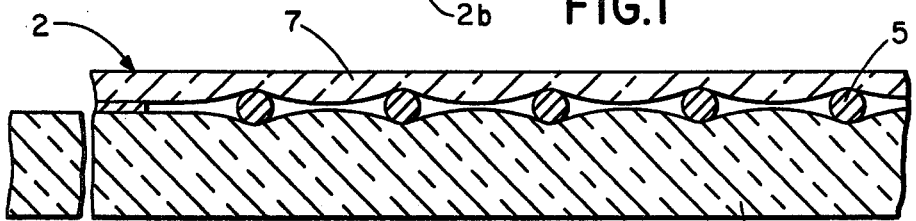
FIG. 2a is a sectional view through a portion of the microfiche card shown in FIG. 2 taken along section line 2a—2a therein.

Therefore, while the microfiche card 2 could be made of a silver halide film like many microfilm records, much better images having an unlimited life (unlike silver halide and other well known films) result when the card is made of material like that disclosed in U.S. Pat. No. 4,000,334 granted Dec. 28, 1976. FIG. 2A, which is a sectional view through a portion of such a microfiche card, illustrates that the microfiche card has a base layer 3 made of a transparent material like Mylar. In the titling area 6 and within each frame 3 the upper surface of the Mylar layer 3 is coated with an imaging layer 5 which may be made of bismuth, tellurium, or other suitable materials which preferably are initially opaque. Applied over the imaging layer 5 may be a transparent protective layer 7 which may also include a photosensitive material. The exact nature of the imaging layer 5 depends upon the manner in which it is desired to form the transparent image-forming spots 14. For example, the best contrast is achieved where the image layer 5 is made of tellurium or bismuth of a thickness to achieve an optical density of at least about 2, and where the image may be produced by a Xenon flash passing through a mask containing a negative pattern of the light transparent and opaque areas desired to be formed and by a subsequent etching process which etches away the non-exposed areas of the layer 7 and the imaging layer 5 therebeneath. If the imaging layer 5 is a heat-dispersible layer like that disclosed in U.S. Pat. No. 4,000,334, the imaging layer may be a layer of lesser thickness which provides an optical density initially of about 1.2 and is made transparent by the internal heat developed by application of radiant energy, such as the energy emitted by a Xenon flash gun, which disperses the imaging layer in those areas struck by the light energy from the Xenon flash gun, to reduce the optical density thereat to about 0.2. In those applications where the dispersible imaging layer 5 is to be rendered transparent in response to the direct application of heat, as by heated nichrome filaments, the imaging layer is formed preferably of a low melting point alloy like those disclosed in application Ser. No. 724,084, filed Sept. 16, 1976.

Figure 2:
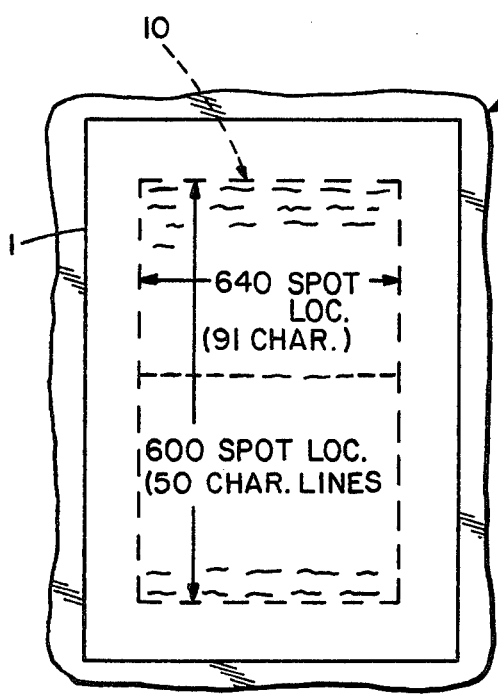
FIG. 2 is a greatly enlarged view of one of the frames in FIG. 2, identifying an exemplary image field thereon, and the dimension thereof measured by the number of potential image spotforming locations encompassing the same.

The exemplary data retrieval system of the invention now to be described can best be understood by referring to an image spot format shown in FIGS. 2 and 3 to which reference will now be made. First of all, each of the microfiche card frames 1 will be assumed to have an image field 10 (FIG. 2) 640 spot-forming locations wide (i.e. in an X axis direction) and 600 spot-forming locations long (i.e. in the Y axis direction). The image field 10 is shown spaced from the margins of the frame 1 involved so that the image field corresponds to the area of a sheet of paper on which typewriting or other data is normally placed. As previously indicated and as shown in FIG. 3, each alphabet or numeric character can be provided into one or more vertical segments, 7 image spot-forming locations long, with varying numbers of image-forming spots in the available locations therefor. The letter F is shown dividable into five such vertical segments. The main vertical leg of the character F is formed by 7 contiguous image-forming spots, the upper horizontal leg of this character F is formed by 5 contiguous image-forming spots, and the lower horizontal leg thereof is formed by 3 image-forming spots. Different combinations of image-forming spots in the various image spot-forming locations involved will form all of the different possible alphabet or numeric characters (or pictorial images). It is preferred that the various legs of each alphabet or numeric character occupy an integral number of image-forming spot locations. As illustrated, the spacing between successive characters is assumed to occupy 2 image-forming spot locations and the spacing between successive lines of characters is assumed to occupy 5 image-forming spot locations.

Figures 4, 5A, 5B:
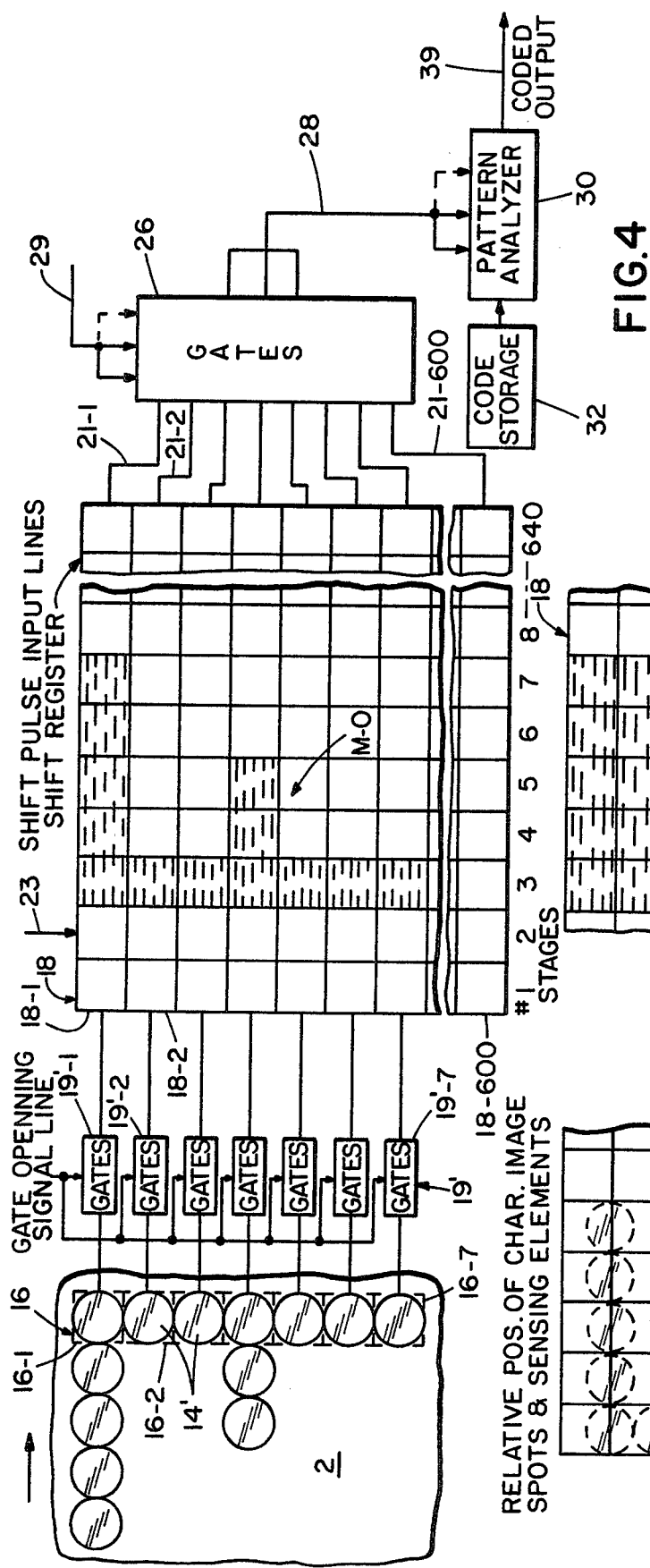

To best illustrate the advantages of the present invention, it would be helpful first to describe one method for retrieving data from the microfiche card 2 having the image spot format just described using techniques at least, in part, disclosed in the prior art, and to explain serious problems resulting from various types of mis-alignment between the image-forming spots 14, the desired image spot-forming locations 15 therein and/or individual light sensing elements of the prior art used to scan the characters formed by the image-forming spots 14. Thus, as shown in FIG. 4, a prior art linear array 16 of 7 light sensing elements 16-1, 16-2 . . . 16-7 is shown, each element intercepting one full image spot 14 projected from the image field 10. (The term "sensing element" is intended to include the energy responsive material struck by the energy involved and also any other related means like a transistor and/or other circuit elements which produce a voltage or other signal of a value depending on the amount of energy striking such material.) The array of light sensing elements 16-1 through 16-7 can thus intercept one entire vertical segment of an alphabet or numeric character. Either the array 16 of light sensing elements or the microfiche card 2 is mounted for movement in X and Y axis directions to effect a line by line scanning of the character lines involved by the linear array 16 of sensing elements. The outputs of the various light sensing elements are respectively fed through gate circuits 19'-1, 19'-2 . . . 19'-7 preferably at the instants of time when the light sensing elements are centered with respect to the image-forming spots forming the various vertical segments of the characters involved. (The instants of times the gates 19 are opened are sometimes referred to as sampling times for the light sensing elements.) If there is substantial mis-alignment between the light sensing elements at the time the gate circuits 19 are opened and the image spots 14' in the vertical segment of the character involved, the signals fed through the gates will cause inaccurate characterindicating signals. The outputs of the light sensing elements coupled through the gate circuits 19'-1 through 19'-7 are fed respectively to the No. 1 stages of a shift register storage unit 18 comprising one shift register for each line of image-forming spot locations in the image field (i.e. 600 shift registers in the exemplary image field format). Each shift register has a number of stages or storage points equal to the number of image-forming spot locations in each line of the image field 10 (i.e. 640 for the format shown in FIG. 2). The proper centering of each image spot 14' and the associated light sensing element will generate a signal of a magnitude passing through the associated gate to form a marker in the No. 1 stage of the associated shift register. As is well known, shift registers shift the binary digit markers in their stages one stage position each time the shift register receives a shift register pulse on a shift register input line. (These lines are collectively identified by reference numeral 23.) These input lines feed a shift register pulse to each of the shift registers 18-1, 18-2 . . . 18-7 at the same instant of time.

It is now apparent that after a line of characters has been scanned, the corresponding 7 shift register stages will contain a pattern of markers M-0 corresponding to centered spots intercepted by the light sensing elements. The shift registers may continuously circulate these markers corresponding to the properly centered image spots. If desired, the circulating markers in the shift registers can be fed sequentially as electrical signals from the shift registers in a conventional manner upon output lines 21-1, 21-2 . . . 21-6, 22, 25-1 through a corresponding series of gates 26 opened by gate-opening pulses on control lines 29. The signals passing through the gates are fed to corresponding output lines 28 extending to a pattern analyzer 30. The pattern analyzer 30 compares the various patterns of signals fed thereto with signal patterns stored in a code storage unit 32. When there is correspondence therebetween, the corresponding binary coded output is fed to an output line 39 extending to a computer input or other output device. The manner in which such binary coded signals are developed from patterns or markers in shift registers representing alphabet, numeric or pictorial data is well known in the art and is not disclosed herein to avoid encumbering this disclosure with unnecessary details.

Reference should now be made to FIGS. 5a—5b, 6a—6b and 7a—7b which illustrate respectively the distortions in or absence of markers in the shift register stages for one-half spot width mis-alignments of the image spots and associated light sensing elements at the sampling times of the sensing elements in the Y axis, Y axis and a combination of X and Y axis directions.

During the various sampling times when the gates 19 are opened, if the projected image spots 14' are precisely centered with respect to the associated light sensing elements scanning the same, during the various sampling times the outputs of the light sensing elements will either be at a maximum level or substantially zero. If there are significant mis-alignments between the image spots 14' and the associated light sensing elements during their sampling times, then an image spot can overlap two different light sensing elements which can cause serious marker pattern distortions to be described due to undesired sensing element outputs.

The output signal of each light sensing element is proportional to the area of the light sensing material thereof struck by light from all of the image spots involved. Whether or not these signals are effective in forming markers in the associated shift register stages depends upon the signal level necessary to form a marker and the area of the light sensing material struck by the one or more image spots involved. A threshold level detector can be provided between the light sensing elements and shift register inputs to establish a reference level above or below which markers will be formed in the shift registers. (If the image spots 14' are light spots, then the threshold detector will pass only signals above the reference level, and if the image spots are dark areas, then the threshold detector will pass signals which are below the reference level.) In the discussion to follow with regard to the mis-alignment problem referred to, it will be assumed that markers are formed in the shift registers only when at least slightly less than half of the area of the light sensing material of a light sensing element is struck by the light from an image spot (which is assumed to be a light spot rather than a dark spot). In other words, if one half of a circular (or square) image spot impinges upon a light sensing element, the resultant half signal will pass through a threshold detector set to pass such signals to form a marker in the No. 1 stage of the associated shift register. (The No. 1 stage of the shift register is assumed to be a particular stage of each shift register to which the marker-forming signals are fed.)

Figure 6A:
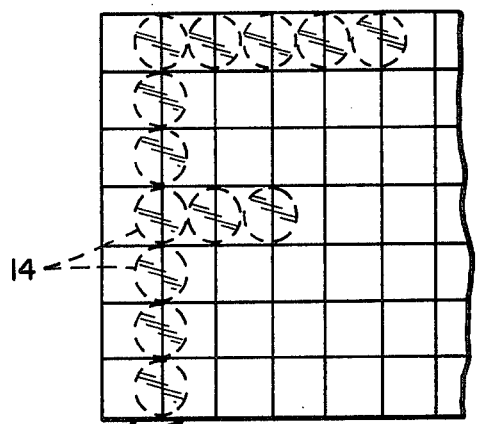
Figure 6B:
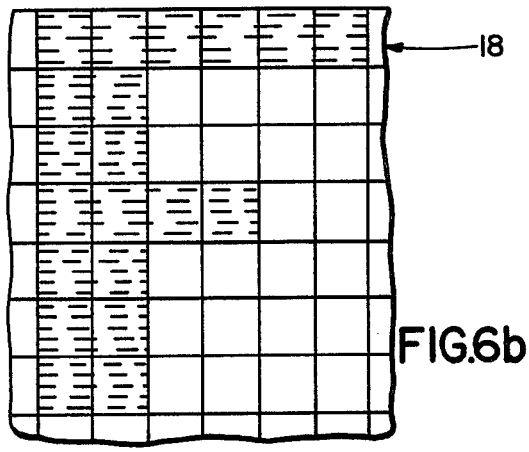
Figure 7A:
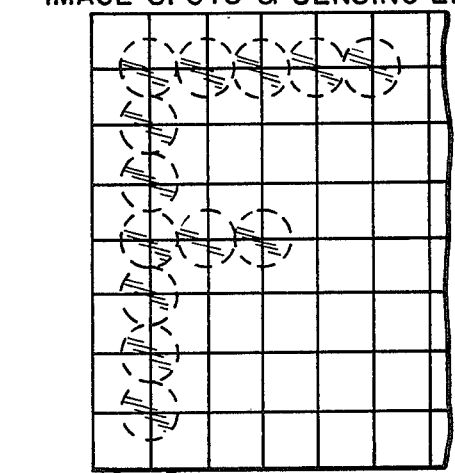
Figure 7B:
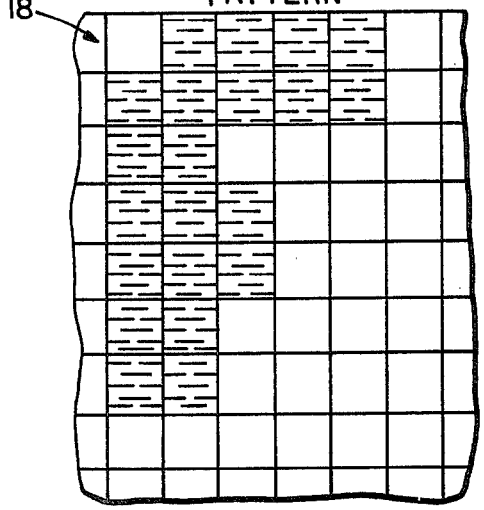

FIGS. 5b and 6b show that for a Y and X axis mis-alignment respectively equal to one half the width of an image spot substantial distortion occurs in the markers stored in the shift register stages illustrated when the threshold detector reference is set to produce a marker when the signal is at least slightly less than one half of the maximum possible output of the light sensing elements. Such marker distortions result in erroneous binary coded signals from the signal comparison operation performed by the pattern analyzer 30 shown in FIG. 4 so that such signals cannot accurately reconstruct the original character or characters involved when fed to character reconstructing output devices. FIG. 7b illustrates the fact that when there is a combination of an X and Y axis mis-alignment equal to one half the width of an image spot under the assumed operating conditions, a higher degree of character distortion appears in the shift register.

The mis-alignment problems just described could be eliminated if at the time each character is formed in the microfiche or other recording medium, a reference marker is positioned opposite each vertical segment of the character involved. Such a reference marker could then be used to gate information from the light sensing elements to function as a control marker sensed by a pair of Y axis control light sensing elements to adjust the Y axis position of the light sensing elements on a microfiche card. However, the use of such reference markers in this way would not only complicate the data recording and data retrieval procedures, but it would require a line by line scanning of the characters involved not required by the present invention for reasons to be described it will furthermore cause unsightly marks to appear on the blownup image field if the microfiche card is to be visually read.

Refer now more particularly to FIGS. 8a, 8b and 8c which together illustrate the improvements of the present invention. As thereshown, one of the basic aspects of the present invention is in utilizing a plurality of sensing elements rather than only one sensing element to intercept a single image spot.

While the broadest aspects of the invention are not so limited, errors due to the aforesaid mis-alignments are best eliminated if an integral number of such light sensing elements greater than one are required to intercept the energy from a single image spot. Thus, a linear array 16' of 600 pairs of light sensing elements is shown extending in the Y axis direction of the image field. The successive pairs of light sensing elements like 16'-1 and 1', 16'-2 and 2' and 16'-7 and 7' are shown respectively intercepting the image spots 14'-1, 14'-2 . . . 14'-7. The pairs of light sensing elements are shown having square shaped light responsive material areas and are shown centered with respect to these image spots. The outputs of these light sensing elements are sampled at successive instants of time where the relative movement between the sensing elements and image spots is one half a spot width. Thus, for such a centered relationship and sampling format, during the intervening sampling periods the linear array of light sensing elements will be in a symmetrical position between two contiguous image spots as shown in FIG. 8b The outputs of the 600 pairs of light sensing elements 16' during a single pass of the image field will be identical to the outputs of a theoretical multiplicity of groups of light sensing elements spanning the entire image field, each group comprising 4 light sensing elements, 2 in an X axis direction and 2 in a Y axis direction, so each can encompass a single image spot. Such a theoretical multiplicity of group of light sensing elements will be hereinafter referred to in connection with references to sampling positions of the light sensing elements and the arrangement of shift register stages. Reference to "theoretical" is made because it would probably be impractical to build an array of light sensing elements which encompass an entire image field. It is significant to note that the Fairchild Camera and Instrument Corp. is presently marketing a linear array of micro-sized light sensing elements comprising as much as 2,000 light sensing elements, each light sensing element having a dimension of only 13 micron on a side. The attainment of an exact correspondence between an integral number of such light sensing elements and the image spots projected thereon can be achieved by any suitable lens system interposed between the microfiche card and this array of light sensing elements.

While, theoretically, the present invention is operable without the use of shift register or other equivalent storage units, as a practical matter, some at least temporary storage unit is needed for storing the sampled signals from the sensing elements which exceed a given reference level, and especially so where a linear array of sensing elements 16' must scan the image field. FIG. 8c shows preferred signal handling portions of the invention which includes a first shift register storage unit 18' which comprise shift register pairs 18'-1 and 18'-1', 18'-2 and 18'-2' . . . 18'-600 and 18'-600', one such pair of shift registers being supplied for storing markers for the threshold detected periodically sampled signals of each successive pair of sensing elements in the array 16'. Each shift register 18'-1 and 18'-1', 18'-2 and 18'-2', etc. has twice the number of shift register stages or storage points than the number of image-forming spot locations in the image field involved, that is 1,280 such storage points or stages for the spot location format shown in FIG. 2, so that there is provided a storage point for each sampled output of each light sensing element. The storage points in the shift registers 18' thus form groups of storage points for the threshold detected outputs of the sampled linear array of sensing elements 16' and corresponding in number and position to the respective groups of said hypothetical multiplicity of groups of such elements referred to. The markers stored in these shift registers shown by shaded areas form a shifting pattern of markers as shift pulses are fed to the shift pulse input lines 23' thereof. These markers are only formed if the signal involved exceeds a given reference level where the image spots are light spots (or when such signal goes below a given reference level when such spots are dark spots in a light background). In the present invention, generally, the reference level is set to one half the maximum signal generated by a light sensing element when an image spot of a reference intensity intercepts all of the area of the light-responsive portion thereof. Thus, the outputs of the linear array 16' of light sensing elements shown in FIGS. 8a and 8b (or the outputs from said theoretically multiplicity of groups of light sensing elements) are fed through a threshold level detector (like 90 shown in FIG. 13 to be described) which preferably detects or passes signals having at least one half the maximum signal when the entire light responsive material of the light sensing element intercepts a light image spot. These threshold detected signals are fed to the shift register storage unit 18' where they are stored as markers in the associated storage points thereof, as shown by the shaded areas in the storage unit 18'.

In addition to the shift register storage unit 18' there is at least provided what is sometimes referred to as a reconstructed marker shift register storage unit 18 which corresponds to the shift register storage unit 18 shown in FIG. 4 in that it has a number of shift registers equal to the number of image-forming spot locations along the Y axis of the image frame, namely 600 shift registers.

It was found that by "OR" gating the outputs of the various groups of storage points in the reconstructed marker shift register storage unit 18 which correspond in number and position to the respective groups of storage units in said theoretical multiplicity of groups thereof that previously significant mis-alignment between the various image spots and the sensing elements will not cause erroneous marker patterns as in the case of the previously prior art data retrieval system of FIG. 4. (An "OR" gate is a means which provides a given binary output, which will here be a storage marker generating signal, if any input thereto has the control binary signal involved, which is here a marker indicating signal.)

In order to "OR" gate the outputs of the various groups of storage points in the shift register storage unit 18', the "OR" gating operation is best carried out in two separate steps. To this end, an intermediate shift register storage unit 18" is provided. Thus, outputs of the successive pairs of shift registers 18'-1 and 18'-1', 18'-2 and 18'-2', . . . 18'-600 and 18'-600' are respectively fed through "OR" gates 19-1, 19-2, . . . 19-600. The "OR" gates 19-1, 19-2, . . . 19-600 will produce a marker (binary 1) output if either one of the corresponding outputs of the stages of the pair of shift registers involved has a marker therein. The marker produced outputs of the "OR" gates are respectively fed to the No. 1 stages of the shift registers 18"-1, 18"-2 . . . 18"-600 of the shift register storage unit 18". Each shift register has the same number of stages or storage points as the shift register of the storage unit 18'. The binary data in the pairs of stages or storage points in each shift register of the storage unit 18" are "OR" gated in the manner now to be described. To this end, respective two-bit shift registers 20-1, 20-2 . . . 20-600 are provided to which the markers, if any, stored in the respective successive pairs of shift register stages of the associated shift registers are fed in succession. The two-bit shift registers 20-1, 20-2 . . . 20-600 each comprise a pair of stages or storage points, and the outputs from these stages or storage points are fed respectively to "OR" gates 22-1, 22-2 . . . 22-600. The outputs of these "OR" gates are then fed respectively to gates 24, in turn, coupled to the input points of the various shift registers 18-1, 18-2 . . . 18-600 of reconstructed marker shift register storage unit 18 through gates 24.

Figure 12A:
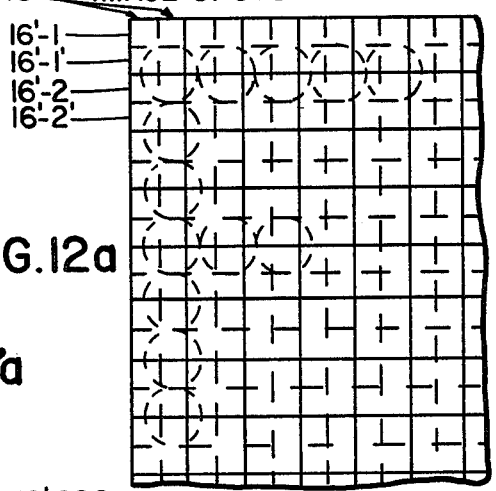
Figure 12B:
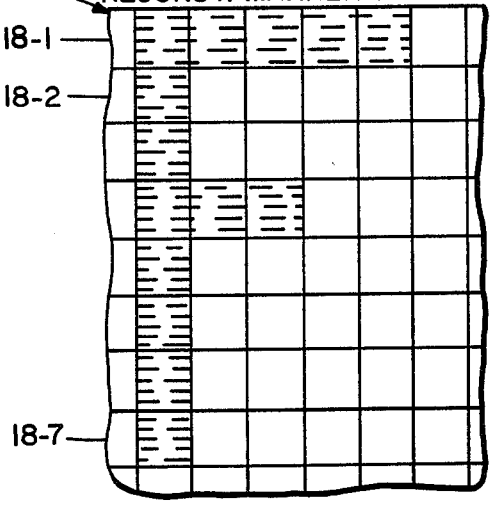
Figure 11A:
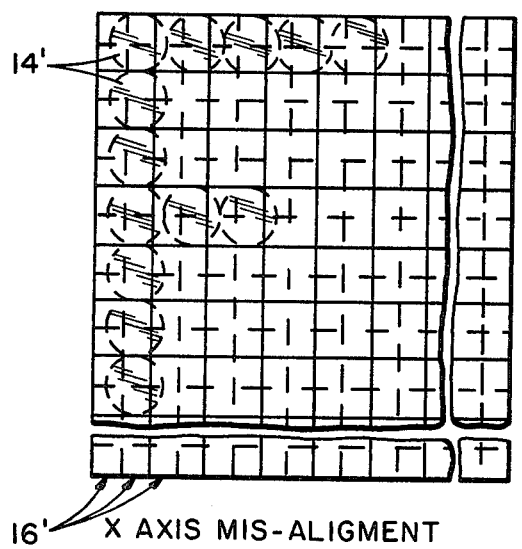
Figure 11B:
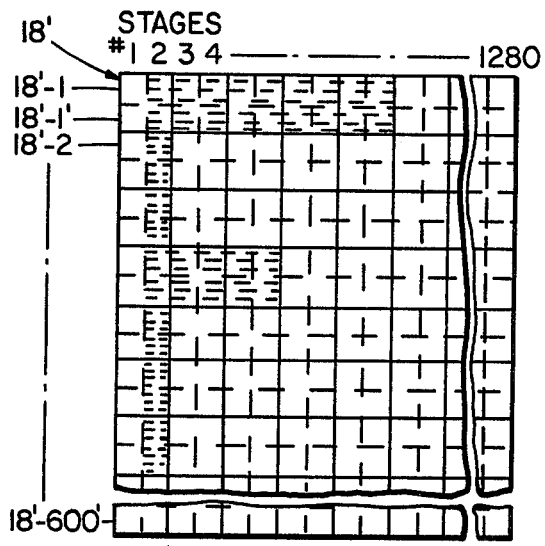
Figure 11C:
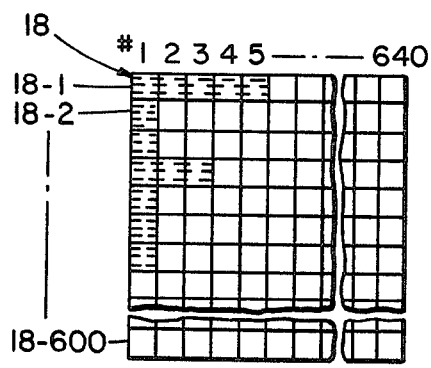

The markers shown in the shift registers 18', 18" and 18 in FIGS. 8c and 9b correspond to the markers which would be present in these series of shift registers where the various pairs of light sensing elements occupy perfectly centered and half-centered positions shown in FIGS. 8a, 8b and 9a. FIG. 9b shows the corresponding marker pattern then in the shift register storage unit 18'. FIGS. 10b and 10c and 11b and 11c, on the other hand, respectively show the pattern of markers in the shift register storage units 18' and 18 for the conditions where there are Y and X axis mis-alignments of the same one half an image spot width with respect to the light sensing elements at the sampling times as are present in the prior art examples of FIGS. 5a and 5b and 6a and 6b, and 7a and 7b. It is significant to note that, despite these mis-alignments, the markers ultimately present in the reconstructed marker shift register 18 as a result of the two series of "OR" gating operations described forms a perfect character F. FIGS. 12a and 12b (mounted adjacent corresponding prior art FIGS. 7a and 7b) respectively show that a combination of X and Y axis mis-alignment of one half spot width, also results in a perfect marker pattern for the character F in the reconstructed shift registers 18.

Figure 13:
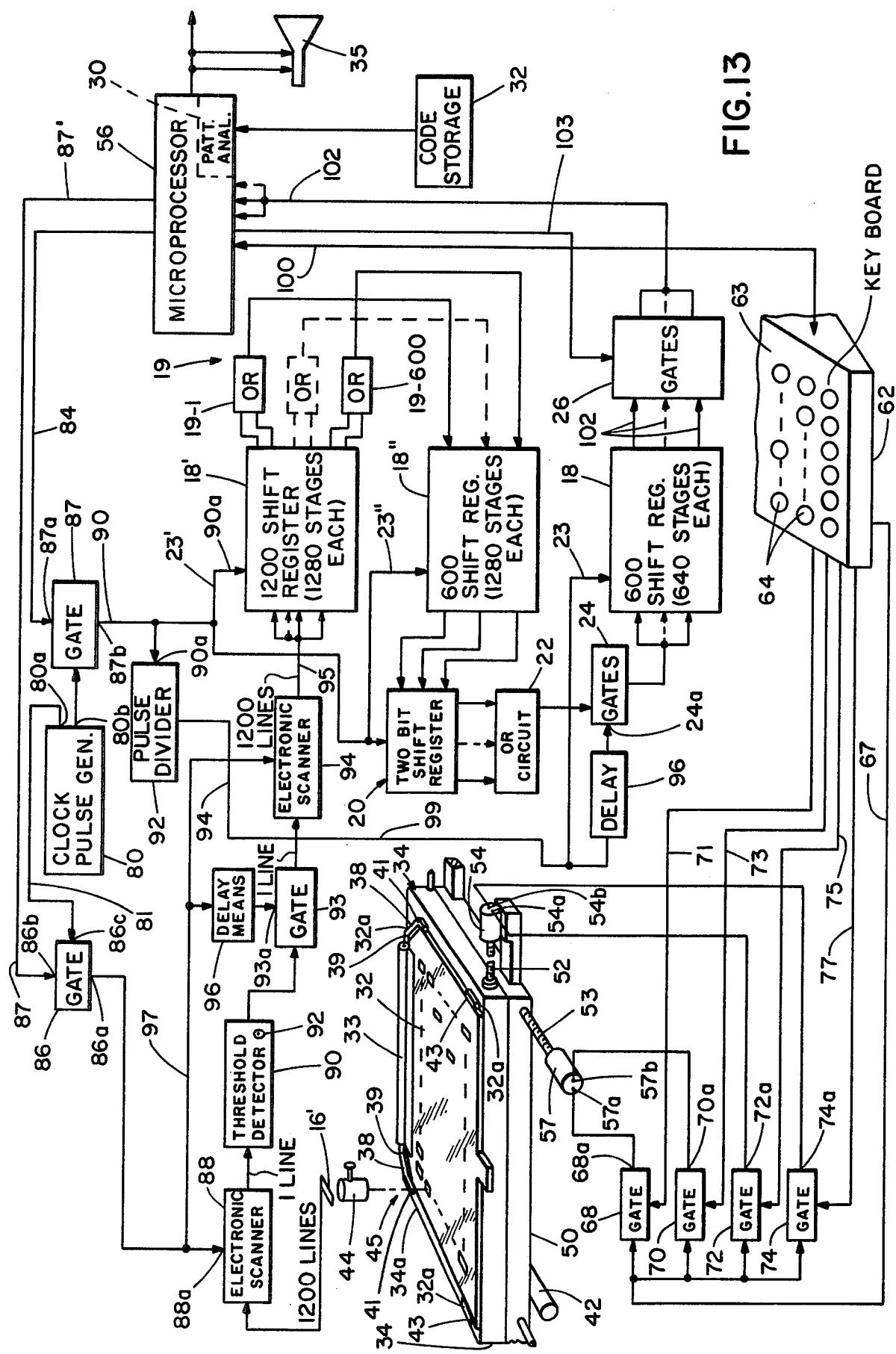
FIG. 13 is a block diagram of an entire data storage and retrieval system of an exemplary preferred form of the present invention.

Reference should be made to FIG. 13 which illustrates a block diagram of an entire data retrieval system which incorporates, among other things, the various shift register storage units, gates, "OR" gates, and threshold detectors above described. As thereshown, the microfiche card 2 is shown supported upon a platform 34a of a carriage 34, in turn, supported for X axis movement on a base 50. Extending upward from the upper corners of the platform 34a are card-positioning walls having angular portions 38—38 against which the inclined edges 4—4 of the card 2 bear and adjacent straight portions 39-41 against which the straight side and top edges 2a—2a and 2c bear in the vicinity of the corners of the card 2. Extending upward from the platform 34a are straight bottom positioning walls 43—43 against which abut the bottom portion of the side edges 2a—2a of the card 2. (Obviously, any means for locating and supporting the microfiche card 2 may be utilized other than the positioning walls just described.) The microfiche card 2 may be held flat against the platform 34a by any suitable means, such as by a cover member 32 pivotly supported by a hinge 33 at the rear of the carriage platform 34a. Extending from the front of the cover 32 is a finger-grasping tab 32a for raising and lowering the cover. The cover is shown with cutaway portions 32a at each upper corner thereof providing clearance for the aforementioned positioning walls 38-41. The carriage 34 and base 50 may be made of transparent synthetic plastic material or the like so as to be transparent to light rays from a light source which is shown as an elongated light tube 42 which is mounted in a fixed position so as to direct light through any selected microfiche card frame in alignment with the same. The light tube 42 is shown extending along the entire Y axis of the microfiche card 2 so that the light rays therefrom will extend through any selected row of microfiche card frames. However, the light passing through only one of these frames is actually utilized. To this end, a magnifying lens unit 44 positioned opposite a readout station 45 is provided for focussing, in the case where a linear array 16' of light sensing elements is utilized, only one column of image-forming spots upon the light sensing element array 16' in accordance with the desired size relationship of the light sensing elements relative to the image spot locations of the projected image field involved, as described. Thus, as previously indicated, if the overall extent of two adjacent light sensing elements is somewhat greater than the actual image spot directed from the selected microfiche card frame, the magnifying lens unit 44 will produce sufficient magnification so that the selected integral number of light sensing elements, two in the example now being illustrated, intercept the Y axis dimension of an image spot 14'.

The base 50 supports an X axis stepping motor 54 which drives a screw 52 or the like. Upon rotation of the screw in one direction of the other, the carriage 34 moves in a corresponding X axis direction. The motor 54 rotates in precise steps in accordance with the number of pulses fed thereto. The motor 54 has a pulse input terminal 54a to which pules are fed to advance the screw 52 in a given direction a given angular amount for each pulse received at the input terminal 54a, and a pulse input terminal 54b to which pulses are fed to advance the screw 52 in the opposite direction a given angular amount for each pulse received at the input terminal 54b. A pulse counter forming part of a microprocessor 56 keeps track of the number of pulses fed to the input and output terminals 54a and 54b so that at any given time the X axis position of the carriage 34 on the base 50 is known.

The base 50 upon which the carriage 34 is mounted for movement in the X axis direction is, itself, supported for movement in the Y axis direction upon a screw 53 driven by a Y axis stepping motor 57. Motor 57 has a pulse input terminal 57a which receives stepping pulses, each of which will rotate the screw 53 a given unit angular amount in one direction, and a pulse input terminal 57b which receives pulses each of which will rotate the screw 53 said given unit angular amount in the opposite direction. The microprocessor 56 keeps track of the number of pulses fed to each of the terminals 57a and 57b so that the Y axis position of the base 50 is known.

Gates 68 and 70 are provided respectively for control of the feeding of stepping pulses on input line 67 to the pulse input terminals 57a and 57b of the Y axis stepping motor 57. Gates 72 and 74 control the feeding of pulses to the input terminals 54a and 54b of the X axis stepping motor 54. Gates 68, 70, 72 and 74 are respectively opened to feed the pulses fed to the inputs thereof to the gate outputs 68a, 70a, 72a and 74a when gateopening signals are fed respectively to gate control terminals 68b, 70b, 72b and 74b. The gate control terminals are fed with control signals on respective control lines 71, 73, 75 and 77 respectively shown extending from a housing 62 which may contain the microprocessor 56. The housing 62 may include a keyboard 63 with various keys 64 thereon for effecting various control functions. For example, one of the keys 64 is depressed by the operator when it is desired to move the carriage 34 to a desired position to bring a selected microfiche card frame opposite the readout station 45. After depression of such a readout key, two other keys may be depressed representing the alphabet and numeric character identifying the particular line and row in which the microfiche card frame to be brought opposite the readout station is located. Thus, depression of microfiche card frame selection keys to the character B and the numeral 3 will bring microfiche card frame No. 3 in row B opposite the readout station 45. The microprocessor 56 in accordance with well known X and Y axis positioning techniques, controls the duration the gates 68, 70, 72 and 74 are opened to effect the proper positioning of the carriage 34 and base 50.

When the selected microfiche frame has been brought opposite the readout station 45, the operator depresses another key 64 to initiate a data retrieval operation. In such case, the microprocessor will effect opening of one of the gates 72 or 74 to effect the feeding of the proper number of pulses to the proper input terminal of the X axis stepping motor 54 to move the microfiche frame past the readout station in a step-by-step fashion to cause an entire image field of the microfiche frame to be scanned in the X axis direction by the array 16' of light sensing elements. (As previously indicated, it is preferred that the array 16' of light sensing elements occupy the entire height of an image field so that no Y axis scanning operation is needed to scan an image field.

As indicated in FIG. 13, the various output lines from the array 16' of light sensing elements is fed to the multiple inputs of an electronic scanner unit 88 which successively scans the outputs of the various light sensing units between the feeding of successive stepping pulses to the X axis stepping motor 54. The electronic scanner has a single output fed to the single input of a threshold detector 90 which detects one signal at a time fed thereto through the electronic scanner 88. Stepping of the electronic scanner 88 to the various outputs of the light sensing elements may be controlled by the feeding of scanning pulses to a control input terminal 88a from the output terminal 86a of a gate 86 which is opened by the feeding of a signal to the control input terminal 86b thereof on a line 87 extending from the microprocessor 56. The input terminal 86c of the gate 86 is fed by a line 81 extending from the high pulse rate output 80a of a clock pulse generator unit 80.

As is apparent from the previous description of the invention, the threshold detector 90 is set to a given threshold level to produce an output whenever the inut signal fed thereto exceeds a given threshold level. This threshold level may be adjusted in a well known way by manual operation of a threshold level control means 92.

The control signals detected by the threshold detector 90 are fed through a gate 93 to the single input of an electronic scanner 94 similar to the scanner 88 except that the input to the electronic scanner 94 is a single input and its outputs are 1200 different output terminals to which the input of the scanner is coupled in succession each time a scanning pulse is fed thereto from the gate 86 by line 97. These output terminals are connected by 1200 lines 95 to the aforementioned shift registers 18′-1, 18′-1′, 18′-2, 18′-2′, . . . 18′-600′ of the storage unit 18′. If it is necessary to delay feeding of the threshold detector output to the electronic scanner 94 to enable the threshold detector 90 to stabilize its output, a suitable delay circuit 96 may be interposed between line 97 and the gate control terminal 93a of the gate 93.

The shift pulse input lines 23′ or the shift registers or storage unit 18′ are shown extending to the output 87b of a gate 87 opened by a signal fed to its control termfinal 87a on a line 84 extending from the microprocessor 56. When a data retrieval operation is called for, a control signal fed to the gate 87 on line 84 will open the gate 87 to feed impulses from the low pulse rate output 80b of the clock pulse generator 80 to the shift pulse lines 23′ of the shift registers of the storage unit 18′ and to shift pulse lines 23″ of the shift registers of storage unit 18″ and shift pulse lines of the two-bit shift registers 20.

As previously indicated, the various markers in the shift registers of storage unit 18″ are fed to the two-bit shift registers 20, and the outputs of the "OR" gates 22 are fed through associated gates 24 which are opened once every two shift pulses fed to the shift registers of storage unit 18″. The shift registers of the reconstructed marker storage unit 18 are shifted at a rate one half of the shift register of storage units 18′ and 18″ and so receive pulses on shift pulse lines 23 fed from a common line 99 extending to the output of a pulse divider 92. The pulse divider 92 reduces by one half the pulse rate of the pulses fed to the input 90a thereof connected to the output of the aforementioned gate 87. The same pulses may be fed through a delay means 96, which delays these pulses a small amount, to the control terminals 24a of the gates 24 so that the output of "OR" gates 22 will not be fed to the gates 24 until their outputs have become stabilized.

The manner in which the markers in the reconstructed marker shift register storage unit 18 are handled in developing binary coded signals corresponding to the pattern of markers therein is identical to the manner in which it is achieved in the prior art, and as illustrated and generally explained in connection with the description of FIG. 4. Thus, the various outputs of the reconstruction marker shift register storage unit 18 are fed to the gates 26 on lines 102 extending to the microprocessor unit 56. The opening of the gates 26 is controlled by control signals fed from the microprocessor 56 to the gates 26 on control lines 103. The aforementioned pattern analyzer 30 shown in FIG. 4 may be part of the microprocessor 56 and is so shown in FIG. 13.

The microprocessor 56 feeds the binary coded signals to the desired computer or the output device. If it is desired that the information retrieved from the selected microfiche card frame also be visible immediately on a cathode ray tube, such as cathode ray tube 35 shown in FIG. 13, the microprocessor 56 will handle the signals fed from the reconstruction marker shift register-storage unit 18 and feed sweep synchronizing pulses to the deflection yokes thereof in a conventional manner to display the image field upon the face of the cathode ray tube.

With the technology presently commercially developed and the unique use of micro-sized commercially available light sensing elements and the unique handling of the signals therefrom in accordance with the invention, data in an entire microfiche frame can be readily, accurately electrically retrieved in a second or less even under the heretofore unsatisfactory mis-alignment condition described. Moreover, a complete data retrieval system can be readily fabricated for less than about $1,000.

While the most important and useful aspects of the invention is in retrieving data from microfilm records, some aspects of the invention have application in retrieving information from a recording medium having image elements which transmit or prevent the transmission of energy other than light energy to an energy sensing unit responsive to the particular energy involved. For example, the image elements recorded on the recording medium could be magnetic spots or the like. Also, it should be understood that the use of the expression "energy transmitting image-froming spots" or other references to the transmission of light or other energy is intended to cover the directing or sending of the energy involved from the recording medium to the energy sensing means involved by passage of energy through energy-transparent portions of the recording medium, or by reflection of such energy off from the recording medium, or by the initial generation of the energy involved on the surface of the recording medium.

It should be understood that numerous modifications can be made without deviating from the broader aspects of the invention.

I claim:

1. In a data storage and retrieval system including a recording medium having recorded thereon information in the form of patterns of energy transmitting or non-transmitting micro-sized image-forming spots surrounded by the other of same and contained within an image field divided into a number of lines of equally spaced potential image-forming spot locations; the improvement in means for retrieving the recorded data represented by the image-forming spots in said image field, said data retrieving means comprising image sensing means including one or more energy sensing elements positioned actively to intercept image spots directed in a substantially non-centered relationship with respect thereto from image-forming spots in said locations, each sensing element being responsive to the parts of one or more image spots impinging thereon by generating a signal of a value depending upon the area thereof which intercepts the image spot or spots involved, each of said sensing elements being at all times much smaller in size than the image spots intercepted thereby so that a number of sensing elements are required in both orthogonally related X and Y axis directions to intercept an entire image spot if they were centered with respect thereto, whereby the outputs available from said one or more sensing elements represent the outputs of an actual or hypothetical multiplicity of groups of said sensing elements intercepting the entire image field and where each group thereof are contiguous and of a size to intercept a single image spot when centered with respect thereto, and means for "OR" gating said sensing element signals representing the respective outputs of each of said different groups of said actual or hypothetical multiplicity of groups of sensing elements, to produce signals representing the patterns of image-forming spots in the image field of said recording medium.

2. The data storage and retrieval system of claim 1 wherein there is provided storage register means having storage points corresponding in number and position to the image-forming spot locations of said image field of said recording medium, and means responsive to said "OR" gated signals for storing image spot indicating markers in said storage points to form a pattern of such markers therein corresponding to the image-forming spots on said recording medium.

3. The data storage and retrieval system of claim 1 wherein there is provided threshold detecting means between the outputs of said sensing elements and said "OR" gating means, whereby the signals which are "OR" gated are signals generated by said sensing elements of a value above or below a given reference level, depending upon whether or not said image-forming spots are energy transmitting or non-transmitting spots.

4. The data storage and retrieval system of claim 3 wherein said reference level is about one half the maximum signal value.

5. The data storage and retrieval system of claim 3 wherein said threshold detector means has progressively adjustable means selectively to vary said reference level.

6. The data storage and retrieval system of claim 3 wherein there is provided storage register means having storage points corresponding in number and position to the image-forming spot locations of said image field of said recording medium, and means responsive to said "OR" gated signals for storing image spot indicating markers in said storage points to form a pattern of such markers therein corresponding to the image-forming spots on said recording medium, and another storage register means having groups of storage points respectively corresponding in number and position to said respective groups of sensing elements in said actual or hypothetical multiplicity of groups of such elements, and means responsive to said signals detected by said threshold detector means which are of a value above or below a given reference level for forming markers in the corresponding storage points in the latter storage register means, said "OR" gating means being responsive to the markers in said various groups of storage points of said latter storage register means by storing the "OR" gated markers in the corresponding storage points of the first mentioned storage register means.

7. The data storage and retrieval system of claim 1 combined with marker information comparison means for converting said "OR" gated signals representing the patterns of image-forming spots in the image field of said recording medium into binary coded signals to be fed to binary coded signal responsive devices like computers or the like.

8. The data storage and retrieval system of claim 1 wherein said sensing elements are micro-sized but of a different size than said image-forming spots, and there being lens means for adjusting the size of the image spots directed on said sensing elements so that an integral number thereof in at least one direction will encompass all or most of the corresponding dimension of an image spot.

9. The data storage and retrieval system of claim 1 wherein there are a large number of sensing elements in at least one of said X or Y axis directions and of a size so that an integral number of sensing elements greater than one are needed to intercept a single image spot if the spot were to be centered with respect thereto.

10. The data storage and retrieval system of claim 9 wherein a group of four contiguous sensing elements, two spaced in each orthogonal direction, will encompass substantially an entire image spot.

11. The data storage and retrieval system of claim 1 wherein said sensing elements are a linear array of sensing elements of a length to encompass a large number of lines of image spots directed upon the same, but of insufficient width to encompass more than one half the width of an image spot, and there is provided means for moving one of said recording medium and sensing elements relative to the other in the direction transverse to the length of said array of sensing elements, and sampling means for sampling the outputs of the sensing elements in said linear array of sensing elements at a frequency wherein said linear array of elements have non-centered positions during the sampling times relative to the image-forming spots impinging thereon at said sampling times and to duplicate the relative positions of said theoretical multiplicity of groups of sensing elements which intercept an entire image field directed thereto.

12. The data storage and retrieval system of claim 11 wherein there is provided threshold detecting means between the outputs of said sensing elements and said "OR" gating means, whereby the signals which are "OR" gated are signals generated by said sensing elements of a value above or below a given reference level, depending upon whether or not said image-forming spots are energy transmitting or non-transmitting spots.

13. The data storage and retrieval system of claim 12 wherein there is provided storage register means having groups of storage points respectively corresponding in number and position to the various groups of sensing elements for said hypothetical multiplicity of groups of sensing elements, and first scanning means interposed between the outputs of said linear array of sensing elements for sequentally feeding at a very relatively high rate of speed the outputs of said sensing elements to a single input of said threshold detector means, and second scanning means coupled between the output of said threshold detector means and a multiplicity of inputs of said storage register means so that said markers are sequentially formed in the storage points which provide a pattern of markers duplicating the locations of said theoretical multiplicity of groups of sensing elements which produce signals above or below said reference level.

14. The data storage and retrieval system of claim 1 wherein said image sensing elements are a linear array of such elements extending transversely to the image spots produced by the image-forming spots along said lines of image spot-forming locations in the image field of said recording medium, and means for moving one of said sensing elements and recording medium relative to the other in at least the direction of said lines of image spot-forming locations of the image field of said recording medium, so that all possible image spots in said image spot-forming locations in said image field are scanned during a given scanning cycle.

15. The data storage and retrieval system of claim 14 wherein said linear array of sensing elements is of a length to encompass the entire corresponding dimension of the projected image field so that image spots produced by all possible image spots-forming locations of said image field in said recording medium are scanned by a single scanning operation transverse to the length of the linear array of sensing elements.

16. The data storage and retrieval system of claim 1 wherein said recording medium is a microfiche card having spaced frames each including a separate image field with light transparent or opaque image-forming spots in patterns forming alpha-numeric and/or pictorial data of such minute size as not to be directly readable without substantial magnification of the image-forming spots, means for supporting one of said microfiche card and sensing means for movement relative to the other, manually operable control means for controlling the movement of the movable one of said microfiche card and sensing means to move a selected frame to a read-out station, and light source means for projecting light through the image field of the selected microfiche card frame to project said image-forming spots thereon upon said sensing means.

17. The data storage and retrieval system of claim 1 wherein said non-centered relationship between said image spots and energy sensing elements when positioned actively to intercept said image spots occurs in both X and Y axis directions.

18. The data storage and retrieval system of claim 1 wherein said image-forming spots form lines of alphabet or numeric characters each divisible into individual vertical columns and horizontal lines of micro-sized image-forming spots together forming a particular alphabet and numeric character of such reduced size that the characters are not readily discernable without substantial magnification thereof, and said image-forming spots forming said characters are so small that each of said energy sensing elements is at least as large as each image-forming spot, and there is provided image-enlarging means for magnifying said image-forming spots so that a number of energy sensing elements are required to intercept an image spot in both X and Y axis directions when centered with respect thereto.

19. In a data storage and retrieval system including a microfilm recording medium having an image field with patterns of light transparent and light opaque areas thereon forming lines of alphabet or numeric characters each divisible into individual vertical columns and horizontal lines of micro-sized image-forming spots together forming a particular alphabet or numeric character of such reduced size that the characters are not readily discernible without substantial magnification thereof, said image-forming spots being roughly positioned contiguous to said image-forming spot locations in the image field of the microfilm recording medium, and light means for projecting light through the light transparent portions of said image field to form light or dark image spots representing the alpha-numeric characters involved; the improvement in means for producing electrical signals from the projected image field, said electrical signal producing means comprising one or more light energy sensing elements positioned actively to intercept said entire projected image field but in non-centered relationship to said image spots directed therefrom, each sensing element being responsive to parts of one or more projected image spots impinging thereon by generating a signal of a value depending upon the area thereof which intercepts the image spot or spots involved, each of said light sensing elements at all times being much smaller in size than the image spots intercepted thereby so that a number of sensing elements are required in both orthogonally related X and Y axis directions to intercept an entire image spot if they were centered with respect thereto, whereby the outputs available from said one or more sensing elements represent the outputs of an actual or hypothetical multiplicity of groups of said sensing elements intercepting the entire image field and where each group thereof are contiguous and of a size to intercept a single image spot when centered with respect thereto, and means for "OR" gating said sensing element signals representing the respective outputs of each of said different groups of said actual or hypothetical multiplicity of groups of sensing elements, to produce signals representing the patterns of image-forming spots in the image field of said recording medium.

20. The data storage and retrieval system of claim 19 wherein there is provided threshold detecting means between the outputs of said sensing elements and said "OR" gating means, whereby the signals which are "OR" gated are signals generated by said sensing elements of a value above or below a given reference level depending upon whether or not said image-forming spots are energy directing or energy obsorbing spots.

21. The data storage and retrieval system of claim 20 wherein said reference level is about one half the signal value.

22. The data storage and retrieval system of claim 20 wherein said threshold detector means has progressively adjustable means selectively to vary said reference level.

23. The data storage and retrieval system of claim 19 wherein said image field of said microfilm recording medium is devoid of position markers or the like between most of said lines of characters.

24. The data storage and retrieval system of claim 19 wherein said non-centered relationship between said image spots and energy sensing elements when positioned actively to intercept said image spots occurs in both X and Y axis directions.

25. The data storage and retrieval system of claim 19 wherein said image-forming spots forming said characters are so small that each of said energy sensing elements is at least as large as each image-forming spot, and there is provided image-enlarging means for magnifying said image-forming spots so that a number of energy sensing elements are required to intercept an image spot in both X and Y axis directions when centered with respect thereto.

26. A data retrieval system for retrieving information from a recording medium, said system comprising a recording medium having recorded thereon information in the form of patterns of micro-sized energy transmitting or non-transmitting image-forming spots surrounded by the other of same and contained within an image field divided into a number of lines of equally spaced potential image-forming spot locations; and means for retrieving the recorded data represented by the image-forming spots in said image field, said data retrieving means comprising image sensing means including one or more energy sensing elements positioned actively to intercept said image spots directed in non-centered relationship thereto from the image-forming spots in said locations, each sensing element being responsive to the parts of one or more image spots intercepted thereby by generating a signal of a value depending upon the area thereof which intercepts the image spot or spots involved, each of said sensing elements being much smaller in size than the image spots to be intercepted thereby so that a number of sensing elements are required in both orthogonally related X and Y axis directions to intercept an entire image spot if they were centered with respect thereto, whereby the signals available from said one or more sensing elements represent the outputs of an actual or hypothetical multiplicity of groups of said sensing elements intercepting the entire image field and where each group thereof is of a size to intercept a single image spot if they were centered with respect thereto, means for "OR" gating said sensing element signals representing the respective outputs of each of said different groups of said actual or hypothetical multiplicity of groups of sensing elements, to produce signals representing the patterns of image-forming spots in the image field of said recording medium, and threshold detecting means between the outputs of said sensing elements and said "OR" gating means, whereby the signals which are "OR" gated are signals generated by said sensing elements of a value above or below a given reference level, depending upon whether or not said image-forming spots are energy transmitting or non-transmitting spots.

27. The data retrieval system of claim 26 wherein said reference level is about one half the maximum signal value.

28. The data retrieval system of claim 26 wherein said threshold detector means has progressively adjustable means selectively to vary said reference level.

29. The data retrieval system of claim 26 wherein said image sensing elements are a linear array of such elements extending transversely to the image spots produced by the image-forming spots along said lines of image spot-forming locations in the image field of said recording medium, and means for moving one of said sensing elements and recording medium relative to the other along said lines of image spot-forming locations of the image field of said recording medium, so that all possible image spots in said image spot-forming locations in said image field are scanned during a given scanning cycle.

30. The data retrieval system of claim 29 wherein said linear array of sensing elements is of a length to encompass the entire corresponding dimension of the projected image field, so that image-forming spots present in all possible image spot-forming locations of said image field in said recording medium are scanned by a single scanning operation transverse to the length of the linear array of sensing elements.

31. The data retrieval system of claim 26 wherein there is provided storage register means having storage points corresponding in number and position to the image-forming spot locations of said image field of said recording medium, and means responsive to said "OR" gated signals for storing image spot indicating markers in said storage points to form a pattern of such markers therein corresponding to the image-forming spots on said recording medium.

32. The data retrieval system of claim 31 wherein there is provided another storage register means having groups of storage points respectively corresponding in number and position to said respective groups of sensing elements in said actual or hypothetical multiplicity of groups of such elements, and means responsive to said signals detected by said threshold detector means from the signals of a value above or below a given reference level for forming markers in the corresponding storage points in the latter storage register means, said "OR" gating means being responsive to the markers in said various groups of storage points of said latter storage register means by storing the "OR" gated markers in the corresponding storage points of the first mentioned storage register means.

33. The data retrieval system of claim 32 wherein there is provided still another storage register means having a number of storage points intermediate the number of storage points in said first mentioned and another storage register means, said "OR" gating means including a first series of "OR" gating means for "OR" gating only the markers in the storage points spaced in said respective groups of storage points in said latter storage register means spaced in the X or Y axis direction, the outputs of said first series of "OR" gating means being coupled to the corresponding storage points of said still another storage register means, said "OR" gating means having a second series of "OR" gating means for "OR" gating only the markers in the storage points of said respective groups in said still another storage register means spaced in the other direction and feeding the resulting "OR" gated signals to the corresponding storage points of said first mentioned storage register means.

34. The data retrieval system of claim 33 wherein said storage means are shift registers.

35. The data retrieval system of claim 26 combined with signal comparisons means for converting said "OR" gated signals representing the patterns of image-forming spots in the image field of said recording medium into binary coded signals to be fed to binary coded signal responsive devices like computers or the like.

36. The data storage and retrieval system of claim 26 wherein said non-centered relationship between said image spots and energy sensing elements when positioned actively to intercept said image spots occurs in both X and Y axis directions.

37. The data storage and retrieval system of claim 26 where siad image-forming spots form lines of alphabet or numeric characters each divisible into individual vertical columns and horizontal lines of micro-sized image-forming spots together forming a particular alphabet or numeric character of such reduced size that the characters are not readily discernable without substantial magnification thereof, and said image-forming spots forming said characters are so small that each of said energy sensing elements is at least as large as each image-forming spot, and there is provided image-enlarging means for magnifying said image-forming spots so that a number of energy sensing elements are required to intercept an image spot in both X and Y axis directions when centered with respect thereto.

* * * * *